(12) United States Patent
Zaldivar et al.

(10) Patent No.: US 11,161,333 B2
(45) Date of Patent: Nov. 2, 2021

(54) METHOD OF IMPROVING DIMENSIONAL STABILITY AND ADHESIVE STRENGTH OF BONDED STRUCTURES

(71) Applicant: The Aerospace Corporation, El Segundo, CA (US)

(72) Inventors: Rafael J. Zaldivar, Redondo Beach, CA (US); Geena Linn Ferrelli, Los Angeles, CA (US); Hyun I Kim, Brea, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 36 days.

(21) Appl. No.: 16/774,971

(22) Filed: Jan. 28, 2020

(65) Prior Publication Data

US 2021/0229413 A1    Jul. 29, 2021

(51) Int. Cl.
*B32B 38/00* (2006.01)
*B32B 3/12* (2006.01)
*B32B 7/12* (2006.01)
*B32B 41/00* (2006.01)
*B32B 37/12* (2006.01)

(52) U.S. Cl.
CPC ............... *B32B 38/00* (2013.01); *B32B 3/12* (2013.01); *B32B 7/12* (2013.01); *B32B 37/1207* (2013.01); *B32B 41/00* (2013.01); *B32B 2037/1253* (2013.01); *B32B 2038/0056* (2013.01)

(58) Field of Classification Search
CPC ..... B32B 38/00; B32B 41/00; B32B 37/1207; B32B 7/12; B32B 3/12; B32B 2037/1253; B32B 2038/0056
USPC .......................................................... 156/64
See application file for complete search history.

(56) References Cited

PUBLICATIONS

Yu et al., An experimental investigation of residual stresses in an epoxy-steel laminate, 2005, Elsevier, International Journal of Adhesion & Adhesives 26, pp. 511-519 (Year: 2005).*

Loh et al., Modelling anomalous moisture uptake, swelling and thermal characteristics of rubber toughened epoxy adhesive, 2004, Elsevier, International Journal of Adhesion & Adhesives 25, pp. 1-12 (Year: 2004).*

(Continued)

*Primary Examiner* — Marc C Howell
*Assistant Examiner* — Abhishek A Patwardhan
(74) *Attorney, Agent, or Firm* — Duane Morris LLP (57) ABSTRACT

A method of accelerating the reduction of residual stress in a bonded structure is provided. The method can include: providing a bonded structure having at least two substructures, wherein the substructures are bonded together with an adhesive; and submitting the bonded structure to a high-humidity environment having a relative humidity of at least 75%. The method can also include a step of submitting the bonded structure to an low-humidity environment having a relative humidity of at most 20%. According to the method, the bonded structure can have a first residual stress at a first time and a second residual stress at a second time, wherein an absolute value of the first residual stress is greater than an absolute value of the second residual stress. According to the method, the residual stress at the second time can be about zero.

20 Claims, 5 Drawing Sheets

(56) References Cited

PUBLICATIONS

Mubasar et al., A method of predicting the stresses in adhesive joints after cyclic moisture conditioning, 2011, The Journal of Adhesion vol. 87, Issue 9, pp. 926-950 (pp. 1-35 for attached document) (Year: 2011).*

Zhang et al., Experimental study of strain rate effects on the strength of adhesively bonded joints after hygrothermal exposure, 2015, Elsevier, International Journal of Adhesion & Adhesives 56, pp. 3-12 (Year: 2015).*

Ul, Environmental-Laboratory Ambient Conditions, 2014, pp. 1-5 (Year: 2014).*

* cited by examiner

METHOD OF IMPROVING DIMENSIONAL STABILITY AND ADHESIVE STRENGTH OF BONDED STRUCTURES

FIELD

The disclosure relates generally to a method of improving the dimensional stability and adhesive strength of a bonded structure comprising at least two substructures; and more particularly, to a method of reducing residual stress in the bonded structure using a sequence of controlled environmental exposures.

BACKGROUND

Residual stress is induced in polymer structures during processing. Controlling residual stress at the interface of bonded polymer substructures is important to the dimensional stability and material strength of the bonded structure. Nearly all polymer structures exhibit some amount of residual stress due to various processing conditions, cure shrinkage, or a mismatch in the coefficient of thermal expansion (CTE) between the bonded substructures. The magnitude of the interfacial stress can change when exposed to external forces such as mechanical, thermal, moisture, or radiation exposure. The stress level can also change over time due to the viscoelastic nature of polymers; however, such stress relaxation can take months to years to occur, and the long-term dimensional changes can be undesirable for sensitive structures like replicated optics or other tools that require nanoscale precision. Indeed, many bonded structures that depend on adhesive bonding are vulnerable to performance degradation due to distortions and deformations of the bonded substructures.

Typically, the processing temperature for curing a polymer is as high as possible in order to maximize crosslinking and, therefore, maximize the mechanical strength and stability of the structure. For instance, the curing temperature often approaches the glass transition temperature ($T_g$) of the material. Manufacturers have attempted to minimize the residual stress in bonded structures by lowering the processing temperature, or by incorporating filler particles to control the interfacial dimension. However, there is a trade-off between quality and stability. While maximum stability may be attributed to a high cure temperature, the thermal exposure may cause stresses that degrade the quality due to a CTE mismatch. And, even at low temperature processing conditions, residual stresses are unavoidable due to cure shrinkage or temperature gradient. Accordingly, there remains a need for a process of eliminating residual stress in bonded structures to maximize stability and material strength, particularly for sensitive structures like optical systems and other tools that require nanoscale precision and stability.

SUMMARY

In various embodiments, a method of reducing residual stress in a bonded structure is provided. The method can comprise the steps of: providing a bonded structure comprising at least two substructures, wherein the substructures are bonded together with an adhesive; and submitting the bonded structure to a high-humidity environment having a relative humidity of at least 50%.

In some embodiments, the method further comprises submitting the bonded structure to an low-humidity environment having a relative humidity of at most 20%.

In some embodiments, the bonded structure comprises a first residual stress at a first time and a second residual stress at a second time, and wherein an absolute value of the first residual stress is greater than an absolute value of the second residual stress.

In some embodiments, the method of reducing residual stress in a bonded structure comprises the steps of: providing a bonded structure comprising at least two substructures, wherein the substructures are bonded together with an adhesive; measuring a residual stress of the bonded structure at a first time; submitting the bonded structure to a high-humidity environment having a relative humidity of at least 50%; and measuring the residual stress of the bonded structure at a second time, wherein an absolute value of the residual stress at the first time is greater than an absolute value of the residual stress at the second time.

In some embodiments, the residual stress at the second time is about zero.

Additional features and advantages will be set forth in the detailed description which follows, and in part will be apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

DETAILED DESCRIPTION

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Figure 1:
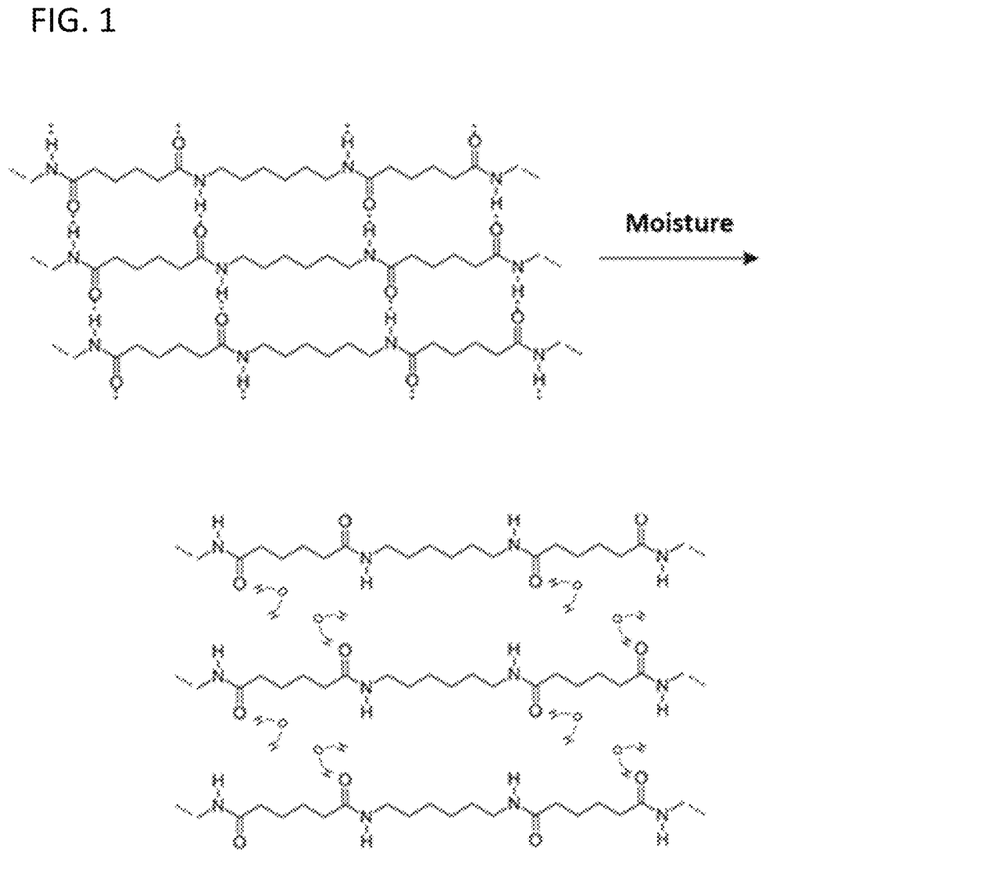
FIG. 1 is a diagram showing the hydrogen bonding between amide groups of neighboring polymer chains being disrupted by water molecules absorbed into the polymer.

Generally, when polymeric structures are placed in a high-humidity environment, the moisture is absorbed in the polymer matrix. Dissolved water molecules can interrupt the hydrogen bonding between polymer chains and therefore reduce the stiffness of the polymeric structure as the polymer chains become further spaced apart. As water is absorbed, the polymeric structure swells and becomes deformed. For example, FIG. 1 shows, on a molecular level, a polymer absorbing water molecules as they become dissolved in the polymer matrix, and the water interfering with the hydrogen bonding between polymer chains. Accordingly, moisture is generally considered harmful to polymeric structures because water can disrupt hydrogen bonding interactions, cause plasticization, and change the material or mechanical properties of the polymer.

Surprisingly, this disclosure provides a method of using a controlled sequence of high-humidity and low-humidity exposures to relieve residual stress an adhesive-bonded structure. In some embodiments, the disclosure provides a method of relieving stress in a bonded structure without polymer degradation. In various embodiments, a method of accelerating stress relaxation in polymers having residual stress and improving the dimensional stability and strength of bonded structure is provided.

The disclosed method of accelerating stress relaxation is generally applicable to most polymers/adhesives. Accordingly, the polymers/adhesives in the bonded structure are not particularly limited. In some embodiments, the polymer comprises a thermoplastic or thermoset. In some embodiments, the polymer comprises an epoxy, vinyl ester, polyester thermosetting plastic, phenol formaldehyde resins, etc. For example, in some embodiments, the material is an epoxy resin. In some embodiments, a particular polymer can be UV-cured, thermally-cured, or both. In some embodiments, a particular polymer is uncured. In some embodiments, the polymer can be a neat resin or a rubber-modified resin (for example, with fillers).

In some embodiments, the bonded structure comprises one substructure and an adhesive on at least one surface thereof. In some embodiments, the bonded structure comprises at least two substructures bonded together with an adhesive. The substructure(s) can be any suitable material. For example, in some embodiments, the substructure comprises polymers, plastics, composite materials (for example, fiber-reinforced polymers (FRP), carbon-fiber reinforced polymers (CFRP), shape memory polymers, engineered woods, metal matrix compositions, ceramic matrix compositions, etc.), silica wafers, glass, metal, wood, etc. The substructures can comprise the same or different materials. When the substructures comprise the same materials, a relatively small mismatch in the coefficient of thermal expansion (CTE) would be expected. By contrast, when the substructures comprise different materials, a larger mismatch in the CTE would be expected. In embodiments having a large mismatch in the CTE, the adhesive bonding the substructures is likely to retain a larger amount of residual stress relative to an adhesive bonding substructures having a relatively small mismatch in CTE.

In various embodiments, the process can be tailored for different materials and/or different processing conditions, resin systems, bonding configurations (for example, thin, uniform films or film adhesives); and local adhesive bonding.

In some embodiments, the method comprises a sequence of high-humidity and low-humidity environmental exposures. In this context, one sequence comprises a high-humidity exposure and a low-humidity exposure. In some embodiments, the method comprises a half-sequence, a single sequence, or a plurality of sequences. In some embodiments, the method comprises from 1 to 100 sequences, or from 1 to 50 sequences, or from 1 to 10 sequences, etc. Each range is inclusive of the various endpoints therein. In some embodiments, a single sequence is sufficient to eliminate the residual stress in a substrate. A "high-humidity" environment means the relative humidity is about 50% to about 100%. By contrast, a "low-humidity" environment means the relative humidity is about 0% to about 20%.

In some embodiments, the level of relative humidity is adjusted during the initial high-humidity exposure, or during subsequent high-humidity exposures depending on the material and/or level of residual stress. In some embodiments, the relative humidity is from about 1% to about 100%, or about 10% to about 90%, or about 35% to about 70%, etc. The endpoints of all ranges are interchangeable and inclusive (for example, about 50%).

In some embodiments, the exposure period for each sequence or for each half-sequence (i.e., a high or a low humidity environmental exposure) can be adjusted to be longer or shorter. In some embodiments, the period for each sequence or half-sequence is the same. In some embodiments, the period for each sequence or half-sequence is different. In some embodiments, the period for various sequences or half-sequences can be mutually exclusive from the other sequences or half-sequences.

In general, as the humidity increases, the rate of stress relaxation increases. Therefore, in some embodiments, a relative humidity of about 100% is preferable. In some embodiments, the humidity is controlled using a wet chamber. In such embodiments, wet air or other gases are injected into the chamber. In some embodiments, the relative humidity is about zero. In some embodiments, a dry chamber is used. In some embodiments, the substrate is dried in the same chamber used for the high-humidity exposure. In such embodiments, the wet air or gases flowing to the chamber can be replaced with dry gases, such as argon or nitrogen. In some embodiments, the substrate can be dried using a low-pressure vacuum-pump in lieu of a dry chamber.

In some embodiments, the method comprises a sequence of high-humidity and low-humidity environmental exposures, or a plurality of sequences. In some embodiments, each sequence or half-sequence is conducted at room temperature (for example, about 23° C.). In some embodiments, each sequence or half-sequence is conducted a temperature above room temperature. Generally, the substrate can be heated up to a temperature that is close to the glass transition temperature ($T_g$) of the material. However, the temperature cannot exceed the $T_g$ because, at temperatures close to and around to the $T_g$, dimensional changes in the bonded structure can occur. In some embodiments, the temperature for the environmental exposures is static. In some embodiments, the temperature is adjusted up or down for a sequence or half sequence. For example, in some embodiments, the method comprises a high-humidity exposure at room temperature and a low-humidity exposure at an elevated temperature (for example, about 30° C., about 50° C., about 100° C., about 250° C., etc.) or over a range of temperatures (for example, 25-300° C., 40-280° C., 120-200° C., etc.). In some embodiments, the high-humidity exposure is conducted at an elevated temperature and the low-humidity exposure is conducted at a reduced temperature (for example, about 10° C., about 0° C., about −15-° C., etc.) or conducted over a range of temperatures (for example, 0-20° C., −15-0° C., etc.). Combinations of room, elevated, and reduced temperatures are interchangeable and inclusive. The endpoints and ranges are interchangeable and inclusive.

In some embodiments, the method comprises a sequence of high-humidity and low-humidity environmental exposures, or a plurality of sequences, and each sequence or half sequence is conducted at atmospheric pressure (for example, about 1 atm). In some embodiments, the pressure for the environmental exposures is static. In some embodiments, the pressure for the environmental exposures is adjusted. In some embodiments, the pressure is adjusted up or down for a sequence or half sequence. For example, in some embodiments, the method comprises a high-humidity exposure at atmospheric pressure and a low-humidity exposure at reduced pressure. In some embodiments, the method comprises a high-humidity exposure at reduced pressure and a low-humidity exposure at reduced pressure. Combinations of atmospheric, reduced, and elevated pressures are interchangeable and inclusive.

EXAMPLES

Various embodiments will be further clarified by the following examples.

Figure 2A:
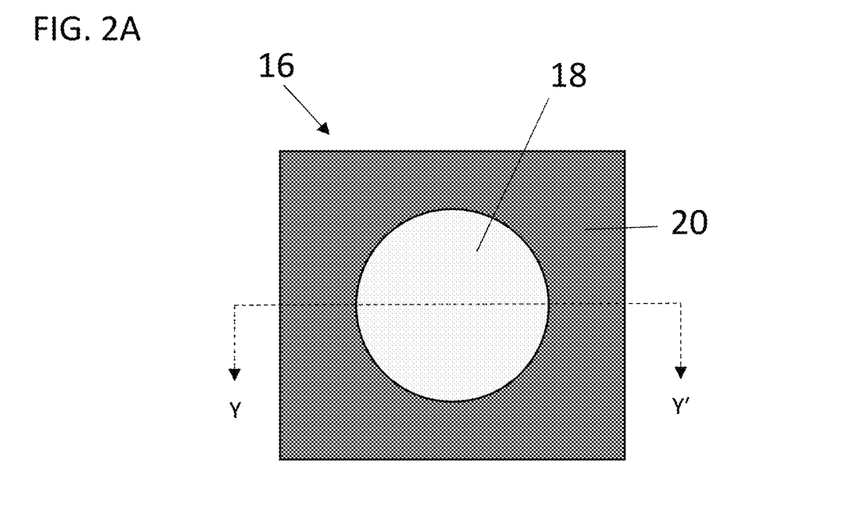
FIG. 2A is a top view of a bonded structure, in accordance with some embodiments described herein.
Figure 2B:
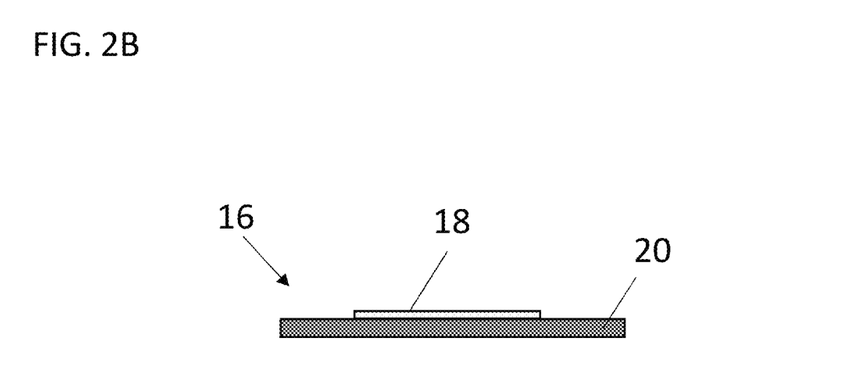
FIG. 2B is a cross-sectional view through the Y-Y' line of the bonded structure of FIG. 2A, in accordance with some embodiments described herein.

FIG. 2A is a top view of bonded structure (16), and FIG. 2B is a cross-sectional side view of the bonded structure (16) along line Y-Y' in FIG. 2A. The bonded structure (16) comprises a substrate (20) having a flat surface upon which an adhesive (18) is applied. In this example, the substrate (20) is a carbon fiber-reinforced polymer and the adhesive (18) is a thin polyester film.

Figure 2C:
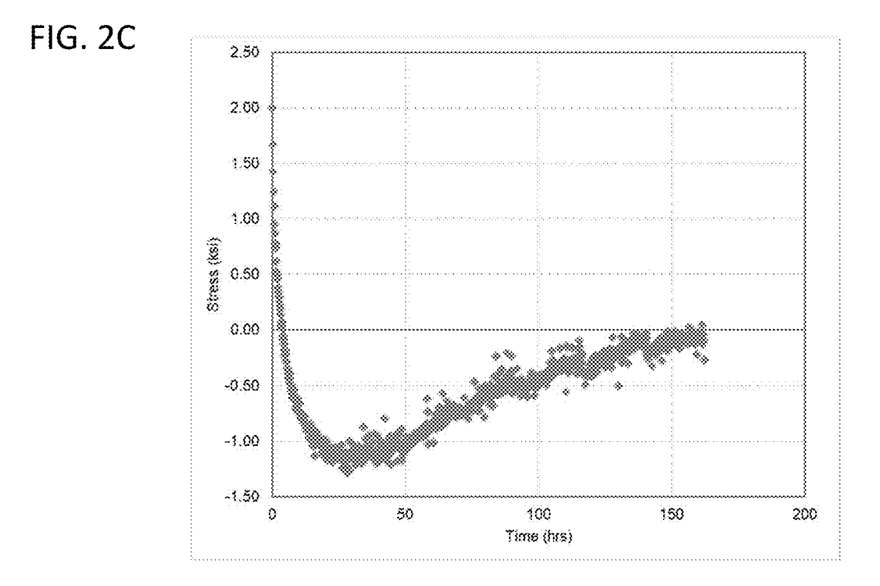
FIG. 2C is a graph showing the stress of the bonded structure of FIG. 2A measured over time, in accordance with some embodiments described herein.

FIG. 2C is a graph showing the residual stress of the bonded structure (16) in FIG. 2A over time. Initially, at a first time (zero hours), the residual stress was measured to be about 2.00 ksi. The bonded structure was then exposed to a 100% relative humidity (RH) environment and the stress was monitored over time. While in the high-humidity environment, the polymer structure absorbed moisture and swelled. After a second time (about 30 hours), a stress of about −1.40 ksi was measured. Surprisingly, after the threshold humidity level and duration (about 30 hours in this example), the stress started to relax. In fact, at a third time (about 160 hours), the stress was about zero ksi.

Figure 3:
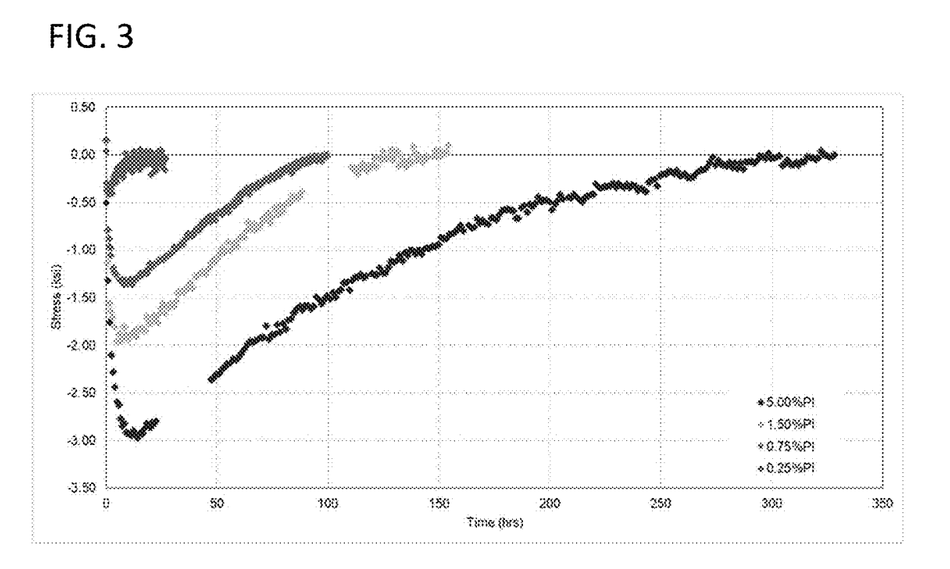
FIG. 3 is a graph showing the stresses of four different bonded structures measured over time, in accordance with some embodiments described herein.

FIG. 3 is a graph showing the residual stress for four different bonded structures. In this example, the bonded structures comprise a substrate and an adhesive. The substrate comprises a carbon fiber-reinforced composite, and the adhesives are common epoxy materials. As shown in the graph, the initial residual stress for the different adhesive-bonded structures varies because the residual stress depends on the material used to make the structure and the processing history of the structure. Despite differences in the initial stress, each of the bonded structures in FIG. 3 exhibits a similar pattern of stress over time. In particular, the stress intensified during the threshold humidity level and duration, and then relaxed to about zero psi over time. Without being bound by a particular scientific theory, one explanation for the pattern of stress relaxation is that the polymer absorbs moisture during the threshold humidity level and duration, and then the water fills the free volume in the polymer matrix and serves as a lubricant to facilitate relaxation.

Figure 4A:
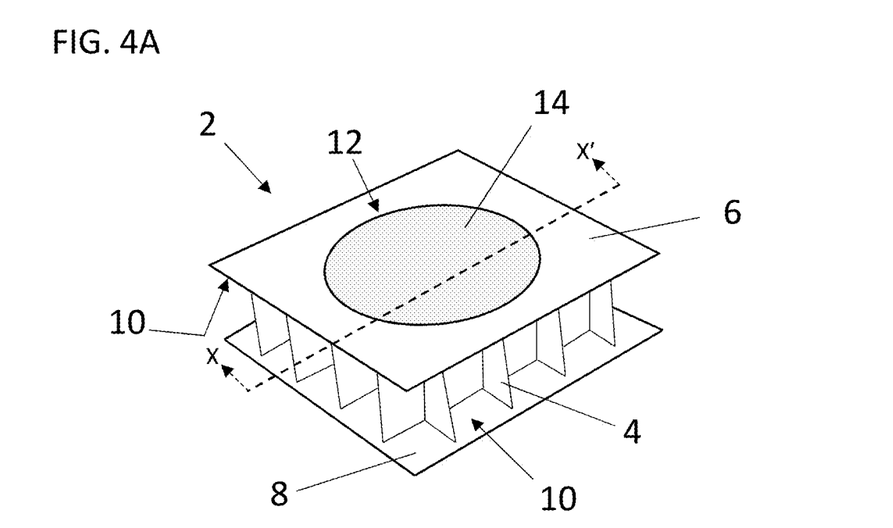
FIG. 4A is an perspective view of an bonded structure, in accordance with some embodiments described herein.
Figure 4B:
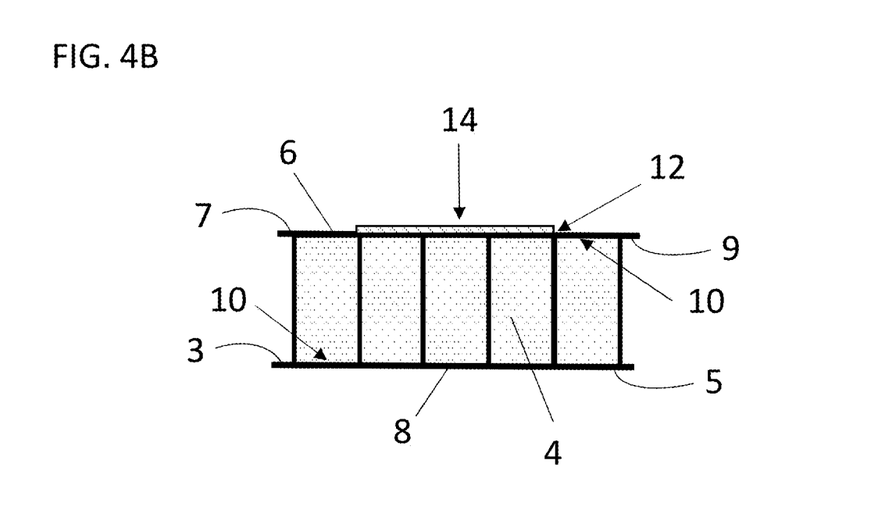
FIG. 4B is a cross-sectional view through the X-X' line of the bonded structure of FIG. 4A, in accordance with some embodiments described herein.

FIGS. 4A and 4B show a bonded structure (2) comprising an egg crate core structure (4); an upper space sheet (6), comprising an outer surface (7) and an inner surface (9), wherein the inner surface (9) is adhesively-bonded to a first surface of the core structure (4); a lower space sheet (8), comprising an outer surface (5) and an inner surface (3), wherein the inner surface (3) is adhesively-bonded to a second surface of the core structure (4); and, a replicated composite mirror (14) adhesively-bonded to the outer surface (7) of the upper space sheet (6). The upper space sheet (6) and the lower space sheet (8) were adhesively-bonded to the core structure (4) with a thermally-cured epoxy resin (10). The replicated composite mirror (14) was adhesively-bonded to the upper space sheet (6) with a uncured epoxy adhesive (12). Accordingly, in this example, the bonded structure (2) includes two different types of bonding adhesives (10, 12).

The replicated composite mirror (14) was fabricated by curing a thin polymeric layer between a glass master coated with a releasing agent and a carbon fiber-reinforced plastic (CFRP) substrate. After separating the thin polymeric layer and CFRP substrate (i.e., the replicated composite mirror (14)) from the glass master, the replication (14) was dried under nitrogen before determining the initial residual stress due to processing.

Figure 4C:
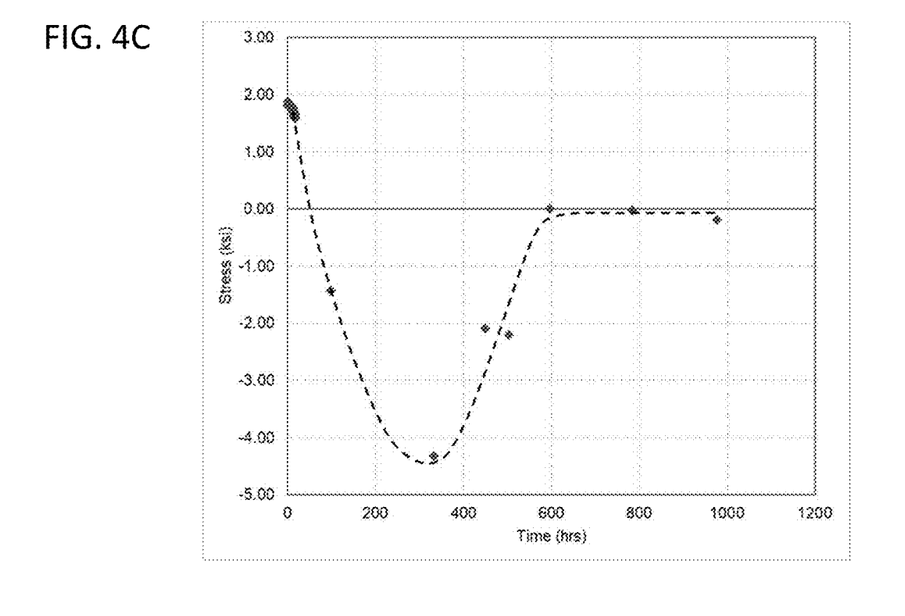
FIG. 4C is a graph showing the stress of the bonded structure of FIG. 4A measured over time, in accordance with some embodiments described herein.

FIG. 4C is a graph showing the stress of the bonded structure (2) in FIG. 4A measured over time. As shown, the initial residual stress at time equals zero was measured to be about 1.90 ksi. The bonded structure (2) was then exposed to a 100% relative humidity (RH) environment and the stress was monitored over time. The graph shows that the bonded structure (2) absorbed moisture and swelled until reaching a stress of about −4.5 ksi during the threshold humidity level and duration (about 225 hours in this example). However, after that period, the stress began to relax. Ultimately, the stress in the bonded structure (2) was determined to be about zero (at about 275 hours).

Figure 5:
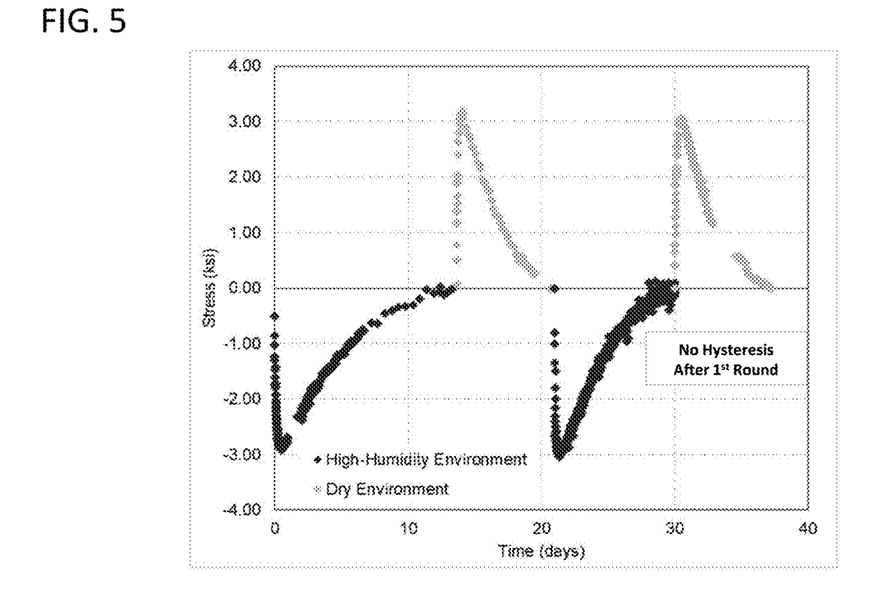
FIG. 5 is a graph showing the stress of an bonded structure after a sequence of high and low humidity environmental exposures, in accordance with some embodiments described herein.

FIG. 5 is a graph showing the stress in a bonded structure over time as the bonded structure is subjected to a sequence of high-humidity and low-humidity environmental exposures. The initial residual stress at time equals zero was measured to be about −0.5 ksi. The bonded structure was then subjected to a first high-humidity exposure. The structure reached a stress of about −3.00 before beginning to relax. After about 13 days, the stress was measured to be about zero. The bonded structure was then subjected to a low-humidity exposure. After an increase in stress to about 3.2 ksi, the stress relaxed back to about zero (at about 21 days). Then, another sequence of high-humidity and low-humidity environmental exposures was carried out to determine whether the process can result in some amount of hysteresis. Starting at about zero stress, the bonded structure reached a stress of about −3.1 ksi during the second high-humidity cycle (about 22 days), and then relaxed back to about zero (at about 30 days). Accordingly, this example shows that after a sufficient duration of high-humidity exposure, the residual stress of the replicated layer can be completely eliminated; and, upon subsequent exposures to low-humidity, high-humidity, and low-humidity environments, the stress returned to zero, which indicates a lack of any meaningful amount of hysteresis.

In various embodiments, the method described herein is fast and easy to implement, cost-effective, and results in a significant increase in bonding stability. In some embodiments, the method is useful for any adhesive-bonded application in which nanometer-scale dimensional stability is required (for example, space telescopes, optical benches). In some embodiments, the method is also applicable to any adhesive-bonded applications in which strength is degraded due to a build-up in residual stresses of bonded parts during thermal cycling (for example, solar panel arrays, antennas).

Exemplary embodiments of the systems and methods are described above in detail. The systems and methods are not limited to the specific embodiments described herein, but rather, components of the systems and/or steps of the method may be utilized independently and separately from other components and/or steps described herein. For example, the system may also be used in combination with other systems and methods, and is not limited to practice with only a system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of reducing residual stress in a bonded structure, comprising:
   providing a bonded structure comprising a substructure and an adhesive bonded to a surface of the substructure, submitting the bonded structure to a high-humidity environment having a relative humidity of at least 75%; and
   submitting the bonded structure to a low-humidity environment having a relative humidity of at most 20%.

2. The method of claim 1, wherein the bonded structure comprises at least two substructures, and wherein the at least two substructures are bonded together with the adhesive.

3. The method of claim 2, wherein the high-humidity environment has a relative humidity of about 100%.

4. The method of claim 1, further comprising:
   (i) repeating the step of submitting the bonded structure to a high-humidity environment having a relative humidity of at least 50%;
   (ii) repeating the step of submitting the bonded structure to an low-humidity environment having a relative humidity of at most 20%; or
   (iii) both (i) and (ii).

5. The method of claim 1, wherein, prior to the providing step, the adhesive is UV-cured, thermally-cured, rubber-modified, or a combination thereof.

6. The method of claim 1, wherein the adhesive comprises an epoxy, vinyl ester, polyester thermosetting plastic, or phenol formaldehyde resin.

7. The method of claim 6, wherein the adhesive comprises an epoxy resin.

8. The method of claim 1, wherein the bonded structure comprises a first residual stress at a first time and a second residual stress at a second time, and wherein an absolute value of the first residual stress is greater than an absolute value of the second residual stress.

9. The method of claim 1, wherein the second residual stress at the second time is about zero.

10. The method of claim 1, wherein the substructure comprises a polymer, plastic, composite material, glass, metal, or wood.

11. A method of reducing residual stress in a bonded structure, comprising:
    providing a bonded structure comprising at least two substructures, wherein the substructures are bonded together with an adhesive;
    measuring a residual stress of the bonded structure at a first time;
    submitting the bonded structure to a low-humidity environment having a relative humidity of at most 30%;
    submitting the bonded structure to a high-humidity environment having a relative humidity of at least 70%; and
    measuring the residual stress of the bonded structure at a second time, wherein an absolute value of the residual stress at the first time is greater than an absolute value of the residual stress at the second time.

12. The method of claim 11, wherein the residual stress at the second time is about zero.

13. The method of claim 11, further comprising:
    (i) repeating the step of submitting the bonded structure to a high-humidity environment having a relative humidity of at least 75%;
    (ii) repeating the step of submitting the bonded structure to an low-humidity environment having a relative humidity of at most 30%; or
    (iii) both (i) and (ii).

14. The method of claim 11, wherein the high-humidity environment has a relative humidity of about 100%.

15. The method of claim 11, wherein, prior to the providing step, the adhesive is UV-cured, thermally-cured, rubber-modified, or a combination thereof.

16. The method of claim 11, wherein the adhesive comprises an epoxy, vinyl ester, polyester thermosetting plastic, or phenol formaldehyde resin.

17. The method of claim 11, wherein the at least two substructures comprises at least one substructure comprising a polymer, plastic, composite material, glass, metal, or wood.

18. The method of claim 1, wherein the step of submitting the bonded structure to the high-humidity environment is performed at about 23° C. and the step of submitting the bonded structure to the low-humidity environment is performed at an elevated temperature of about 40° C. to about 280° C.

19. The method of claim 1, wherein the step of submitting the bonded structure to the high-humidity environment is performed at an elevated temperature of about 40° C. to about 280° C. and the step of submitting the bonded structure to the low-humidity environment is performed at a reduced temperature of about 0° C. to about 20° C.

20. The method of claim 11, wherein the step of submitting the bonded structure to the high-humidity environment is performed at about 23° C. and the step of submitting the bonded structure to the low-humidity environment is performed at an elevated temperature of about 40° C. to about 280° C.

* * * * *